United States Patent [19]

Siefert et al.

[11] Patent Number: 4,462,447

[45] Date of Patent: Jul. 31, 1984

[54] PNEUMATIC TIRE

[75] Inventors: George J. Siefert, Akron; Michael A. Kolowski, Tallmadge; John E. Lynch, Bedford; Terrence M. Ruip; Henry L. Gresens, both of Akron, all of Ohio

[73] Assignee: The Goodyear Tire & Rubber Company, Akron, Ohio

[21] Appl. No.: 824,757

[22] Filed: Aug. 15, 1977

[51] Int. Cl.³ .................... B60C 13/00; B60C 5/12
[52] U.S. Cl. ........................ 152/353 C; 152/352 R
[58] Field of Search ........... 152/352 R, 353 R, 353 C, 152/354, 378 R, 379.1

[56] References Cited

U.S. PATENT DOCUMENTS 3,486,547 12/1969 Powers ..................... 152/352 R
3,841,375 10/1974 Edwards ................ 152/353 R X
4,019,551 4/1977 Kolowski et al. ............. 152/354
4,029,137 6/1977 Suydam ................. 152/354 R X
4,077,455 3/1978 Curtiss, Jr. et al. ............ 152/354 R Primary Examiner—Randolph Reese
Attorney, Agent, or Firm—Frank Pincelli

[57] ABSTRACT

The elliptically-shaped tire has a pair of oppositely-opposed bead cores, a carcass structure each end of which is wrapped around a bead core, an apex disposed between the carcass structure and each of the ends thereof, a pair of oppositely-opposed sidewalls overlying the carcass structure, a chafer strip positioned between the carcass structure and each of the sidewalls, and a tread overlying the carcass structure and a belt reinforcing structure positioned therebetween. The carcass structure has a carcass aspect ratio of about 60. Additionally, the tire has a pair of oppositely-opposed sidewall portions having a relatively thin radially outer portion and a relatively thick radially inner portion.

14 Claims, 2 Drawing Figures

PNEUMATIC TIRE

BACKGROUND OF THE INVENTION

This invention relates to a pneumatic tire and to a pneumatic tire mounted on a rim, and more particularly to an elliptically-shaped pneumatic passenger tire and to such a tire mounted on a rim.

It is well understood in the tire and automobile industries that a tire must exhibit certain performance characteristics and meet certain minimum performance standards before it is commercially acceptable. Among such characteristics and standards are those directed to rolling resistance, ride harshness and vibration, ride handling, traction, tread wear, durability, noise and the like.

It is further understood that the design of a tire entails the use of various materials as tire components and their placement within the tire in order to provide a combination which achieves commercially acceptable performance characteristics and standards. Because of the complex nature of the interaction of the materials and components of a tire, it is generally accepted that certain trade-offs are necessary in meeting the foregoing performance characteristics and standards. Additionally, the degree and extent of such trade-offs are not known until the tire is actually made and its performance and characteristics evaluated.

One of the more well-known trade-offs taken into account in tire design and construction is that rolling resistance can be decreased by increasing tire inflation pressure. A further trade-off which is taken into account is that as the tire inflation pressure is increased, the ride harshness and vibration also increases. Therefore, in tire design and construction, taking these and other factors involved into consideration, some degree of rolling resistance is generally sacrificed by using lower inflation pressures in order to achieve acceptable smoothness and comfort in riding or ride harshness and vibration.

Rolling resistance may be expressed by using several different test results. Such tests can be directed to the distance a vehicle travels at constant speed on a specified quantity of fuel, the distance to rest a vehicle travels after it is at constant speed and its power train disengaged from the wheels, or by the amount of drag exerted by the tire when running at a constant speed. The most widely-known form of expressing rolling resistance is in terms of drag. In one test to determine drag the torque of a tire being rotated at a constant speed by frictional engagement with a driving flywheel is determined and then translated into drag.

Ride harshness and vibration is determined by a subjective test in which a vehicle, with the tires to be tested, is driven over a prescribed course and rated by the driver with respect to various ride attributes which are felt or perceived by the driver in the vehicle under typical driving conditions generally experienced by the average motorist. For relatively smooth roads or course, vibration is evaluated, and for relatively rough roads or course, ride harshness is determined.

From the foregoing it can be appreciated that a pneumatic tire which exhibits a decrease in rolling resistance over conventional pneumatic tires and still meets or exhibits commercially accepted performance standards and characteristics would represent an advancement in this art. Further, it would afford a significant contribution to the automobile industry and the millions of motoring public since a decrease in rolling resistance increases fuel economy in the ratio of approximately 5 to 1, based on industry data by plotting fuel economy against rolling resistance. Thus, for example, a 20% decrease in rolling resistance is considered to be approximately equivalent to an increase of 4% in fuel economy. Stated somewhat differently, a passenger vehicle using conventional tires and obtaining 24 miles per gallon could save as much as one mile per gallon in fuel consumption, or approximately 20 additional miles for a tankful of fuel.

As will be more fully discussed hereinafter, and improved elliptically-shaped pneumatic tire under inflation pressures of up to 50% or more than inflation pressures used in conventional tires exhibits a significant decrease in rolling resistance while meeting or exceeding other tire performance characteristics and standards, including ride harshness and vibrations, and thus represents an advancement in this art as well as a significant contribution to the industry.

IN THE DRAWINGS

DESCRIPTION

Figures 1, 2:
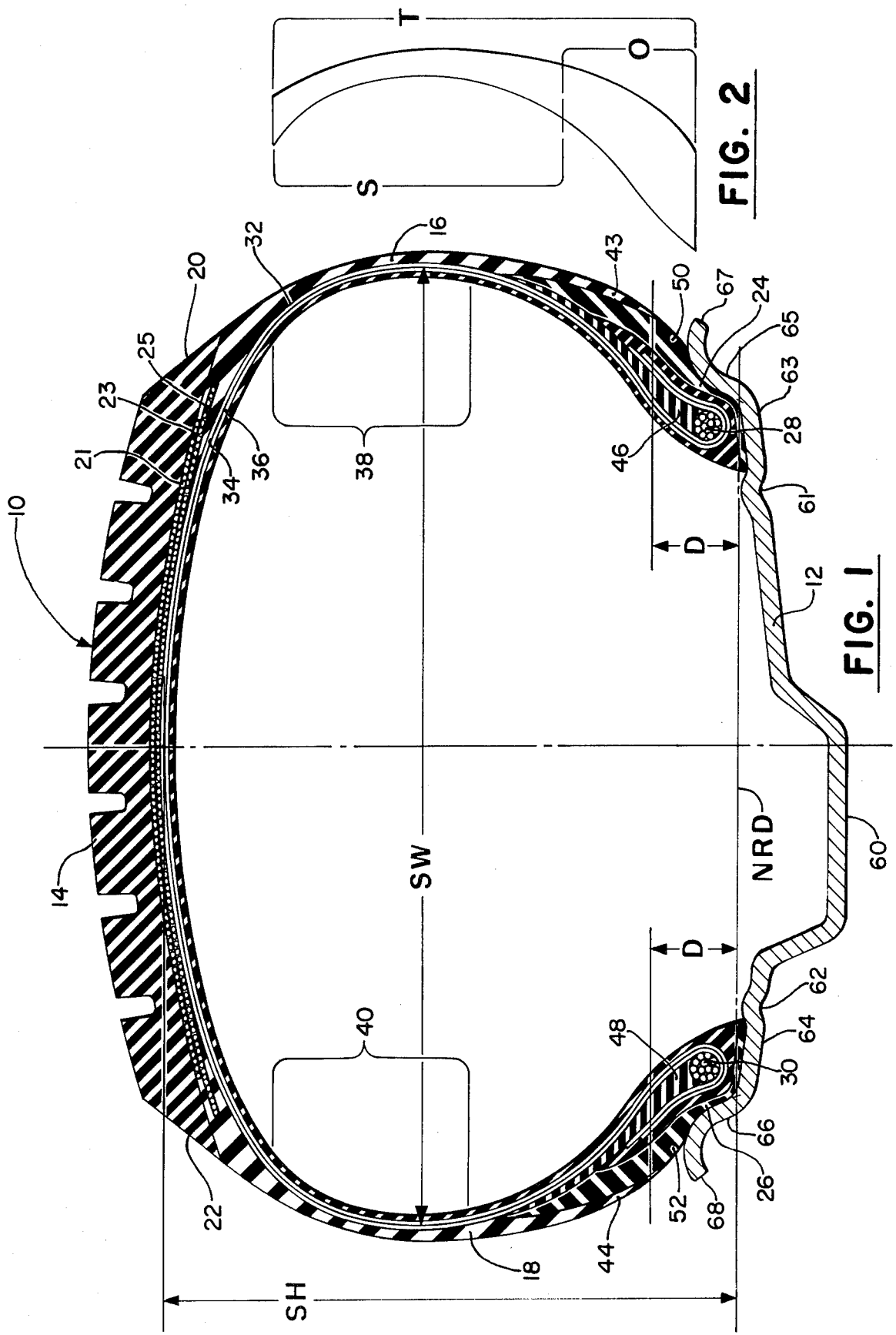
FIG. 1 is a cross-sectional view of a pneumatic tire described herein mounted on a rim and inflated to design inflation pressure.
FIG. 2 is a schematic radial half-section of the sidewall portion of a pneumatic tire described herein.

With reference to FIG. 1, there is illustrated an elliptically-shaped tire 10 in its design inflated condition and mounted in an unloaded condition on rim 12. The tire includes a pair of oppositely-opposed bead cores, 28 and 30, a carcass structure 32, which includes carcass plies 34 and 36 and may include a conventional innerliner, not shown, if the tire is to be of the tubeless type. The ends of the carcass structure are wrapped around the bead cores, as shown, and an apex 46 and 48 is disposed between the carcass structure and each of the ends thereof. A pair of chafer strips, 50 and 52, are provided over the carcass structure and are positioned between the carcass structure and the sidewalls 16 and 18. A pair of belts 23 and 25 are shown overlying the carcass structure 32 and a tread 14 overlies the belts.

The foregoing tire structure includes bead portions 24 and 26 which is the area of the tire that is shaped to fit rim 12 and engages therewith; a tread portion 14, the area of the tire which comes into contact with the road; a pair of shoulder portions 20 and 22, which is the area generally including the portion on the outside of the tire between the tread portion 14 and the sidewall portions 16 and 18, respectively, as shown in FIG. 1, and a sidewall portion 16 and 18 which is the area generally included from just above the bead portion to just below the shoulder portion but not including the shoulder portion, tread portion or bead portion.

The belt reinforcing structure 21 extends circumferentially about the carcass structure 32 and beneath tread 14. The belt structure of rubberized special fabric with cords (nylon, polyester, rayon, aramid, glass fiber and the like) or steel wire can be made up of one or more plies with any conventional cord angle. If a plurality of plies are used, the plies can be structured or positioned in any manner including edge overlap and the like. A belt reinforcing structure of two plies each having steel wires with a cord angle of about 23° encompassed within a rubber material with the outermost belt ply 23 being narrower than the innermost belt ply 25 can be used in a passanger tire.

The carcass structure 32, or body of the tire, includes plies or layers of rubber-coated fabric cords (nylon, polyester, rayon, aramid, glass fiber and the like) or steel wire and is typically of the radial type construction, that is, a carcass in which the cords or wire within the plies form an angle from about 75° to 90° with the mid-circumferential plane of the tire. Any number of carcass plies can be used depending upon, inter alia, the size and load rating of the tire and its intended applications. For passenger tires a two-ply construction is typically used.

The carcass aspect ratio of the tire denotes the relationship of the maximum carcass section height SH divided by the maximum carcass section width SW as measured on an unloaded, inflated tire mounted on a 70% rim as determined in accordance with the standards of the Tire and Rim Association. The carcass aspect ratio may range from 50 to 70, more particularly 55 to 65, and preferably 60, and is measured using the neutral carcass contour, which in a single radial ply carcass is the ply itself but in a carcass structure having a plurality of plies is located midway between the outermost and innermost plies. The maximum carcass section width SW, therefore, is the maximum axial distance between the neutral carcass contour of sidewalls 16 and 18. The maximum section height SH, therefore, is the maximum radial distance between the neutral carcass contour of the carcass structure beneath the tread portion and the nominal rim diameter NRD which, as shown, is a line tangent to the bead heel radius of the rim and parallel to the rotational axis of the wheel.

The sidewall portions 16 and 18 each have a radially outer portion 38 and 40, respectively, which is relatively thin in thickness and a radially inner portion 43 and 44, respectively, which is relatively thicker in thickness. The radially outer portion extends from a point equal to about 45% of the maximum carcass section height SH to the shoulder portion. The radially inner portion extends inwardly along the surface of the sidewall from that point to the bead portion. The radially outer portion is relatively constant in thickness whereas the radially inner portion has a maximum thickness at a distance D of approximately 20% of the maximum carcass section height SH. The ratio of the sidewall portion of maximum thickness (radially inner portion) to the minimum thinness (radially outer portion) is from about 3.5:1 to about 5:1, with about 4:1 being typical for a conventional size and type passenger tire.

With reference to FIG. 2, the sidewall portions each have an inner surface which includes an upper surface portion S and a lower surface portion O. The upper surface portion extends from a point equal to about 34% of SH to approximately 84% of SH. The lower surface portion extends from a point equal to about 8% of SH to the point at which the upper surface portion begins (about 34% of SH).

The surface contour of upper surface portion S generally follows the equation:

$$S = -\left[\frac{(\rho_m)^2}{(\rho_o)}\right][F(\theta, K)] - [\rho_o][E(\theta, K)] \quad (I)$$

wherein, $$\theta = \arcsin\sqrt{\frac{\rho_o^2 - \rho^2}{2(\rho_o^2 - \rho_m^2)}};$$

$$K = \sqrt{\frac{2(\rho_o^2 - \rho_m^2)}{\rho_o}}$$

S is equal to the axial distance from the centerplane to the natural shape line of the carcass structure;

$\rho_o$ is equal to the radius from the axis of rotation at the centerline of the tire to the natural shape line of the carcass structure;

$\rho_m$ is equal to the radius from the axis of rotation to the maximum axial distance on the natural shape line of the carcass structure to the centerplane of the tire;

$F(\theta, K)$ and $E(\theta, K)$ are elliptical integrals of the first and second kind, respectively.

This known equation of natural shape in which $\rho_o$ and $\rho_m$ may be determined from the boundary conditions of the surface S and the cord angle is 90°, is derived and further explained in, for example, *Mathematics Underlying the Design of Pneumatic Tires* by John F. Purdy, Edwards Brothers, Inc., Ann Arbor, Mich. (1963), Chapter II, pages 35-36.

The surface contour of lower surface portion O generally follows the equation:

$$O = K_o + K_1 X + K_2 X^2 + K_3 X^3 + K_4 X^4 + K_5 X^5 \quad (II)$$

For this equation, O is the axial distance from the mid-circumferential plane of the tire, X is the distance from the rotational axis of the tire, and the constants have the following values:

| | | | |
|---|---|---|---|
| $K_0 =$ | 6.42 | $K_3 =$ | 1.69715 |
| $K_1 =$ | 23.81 | $K_4 =$ | −.11605 |
| $K_2 =$ | −10.6733 | $K_5 =$ | .0029 |

The sidewall portions each have an outer surface T which extends from a point approximately 8% of SH to a point approximately 84% of SH. The surface contour of outer surface T generally follows the equation:

$$Th = K_o' + K_1'X + K_2'X^2 + K_3'X^3 + K_4'X^4 + K_5'X^5 \quad (III)$$

For this equation, Th is the gauge thickness from the contour of the inner surface measured parallel to the axis of rotation of the tire to the outer surface contour T, X is the distance from the rotational axis of the tire, and the constants have the following values:

| | | | |
|---|---|---|---|
| $K_o' =$ | −3.981 | $K_3' =$ | −2.73194 |
| $K_1' =$ | −44.639 | $K_4' =$ | 0.17864 |
| $K_2' =$ | 18.2917 | $K_5' =$ | −.004329 |

The surface contour of the outer surface, as expressed by gauge thickness Th, may vary by a thickness GT from a point approximately 8% of SH to a point approximately 42% of SH. This deviation in thickness generally follows the equation:

$$GT = K_1''X + K_o'' \quad (IV)$$

For this equation, GT is the deviation in thickness, X is the distance from the rotational axis of the tire, and the constants have the following values:

$K_1'' = -0.0526$
$K_o'' = 0.6208$

The radially inner portion is relatively stiff in order to minimize flexing and the like of this area under various road conditions; whereas, the radially outer portion has a relatively thin sidewall in order to dampen ride harshness and vibrations. In addition, in order to aid the stiffness of the radially inner portion, apex 46 and 48 has a Shore A hardness of between about 75 and about 95 durometers and a modulus of between about 19 and about 32 meganewtons/meter$^2$ (300% elongation), and the chafer strip 50 and 52 has a Shore A hardness of between about 70 and about 90 durometers and a modulus of about 11.5 to about 13.5 meganewtons/meter$^2$. Preferably each sidewall 16 and 18 is of a rubber material having a high rebound resiliency and preferably having a hot rebound resiliency of at least 85 (ASTM D1054).

The tread width, that is the maximum width of the tread as measured from the tire's footprint perpendicular to the circumferential centerline of the tire when it is inflated to designed inflation pressure and rated load, of the tire may be between about 70% to 80%, preferably 76%, of the maximum carcass section width SW. Preferably the tread is of a rubber material having a high rebound resiliency and especially preferred is a material having a hot rebound resiliency of at least 80 (ASTM D1054).

The wheel rim 12 has a profile which includes the rim well 60 intermediate between a pair of oppositely-opposed annular rim beads 61 and 62. A rim bead seat, such as 63 and 64, extends outwardly from each rim bead at an inclined angle and is integrally formed with a rim flange, such as 65 and 66, which terminates in a pair of rim flange ends as shown by 67 and 68.

The bead portions of the tire engage the bead seats and the rim flanges in order to secure the tire to the wheel rim and the rim beads assist in maintaining the engagement. The rim well can be of any shape and as shown is of a conventional drop center type design. The rim bead seat as shown is inclined outwardly and typically has an angle of a few degrees, that is from about 2° to about 10°, more particularly about 5°, as measured between a plane parallel to the axis of rotation and passing along the surface of the bead seat. The rim flange is flared outwardly at a greater angle than the bead seat angle, more particularly from about 25° to about 60°, and preferably about 50° of an angle between a plane parallel to the axis of rotation and passing through the innermost portion of the rim flange and a plane passing along the surface of the rim flange. The rim flange ends can be curved outwardly in any manner and as shown are flared slightly.

The rim has a relatively low flange height as measured radially outwardly from the nominal rim diameter NRD to the top of the rim flange. In general, this flange height may vary but is usually from about 7% of SH to about 11% SH, with about 9% SH being preferred.

The profile of the bead toe below the bead core when made is inclined at an angle substantially greater than the angle set forth above with respect to the rim bead seat. This angle as measured on the bead heel is the angle between a plane parallel to the axis of rotation and passing through the annular point of the bead heel radially inward when the tire is in a relaxed condition in the mold and the inclined plane passing through the bottom surface of the bead. Typically this angle is from about 10° to about 20° and it is preferred to have an angle of about 15°. When the tire is mounted on the rim and inflated to design inflation pressures, the difference in the bead heel angle and the bead seat angle results in the bead being under relatively high compression in order to assist in maintaining a secure engagement with the rim. For a conventional size passenger tire this compression has been found, in inches, to be at least 0.035 inches (0.89 mm) and preferably about 0.08 inches (2.03 mm).

The following is set forth in order to describe the tire and the tire rim combination with more specificity:

Pneumatic passenger tire size: P215/65R390
Aspect ratio = 61.5
Tread width = 6 inches (152.4 mm)
Inflation pressure = 35 psi
SW = 8.1 inches (205.74 mm)
SH = 4.98 inches (176.49 mm)
NRD = 15.3543 inches (390 mm)
D = 22% SH
Radial inner portion thickness at D = 0.81 inches (20.57 mm)

Ratio sidewall $\frac{\text{maximum thickness}}{\text{minimum thinness}} = 4.05$ Rim bead seat angle = 5°
Rim flange angle = 50°
Rim flange height = 0.47 inches (11.938 mm)

The foregoing described passenger tire with an inflation pressure of approximately 50% more than inflation pressures used in conventional radial passenger tires (35 psi versus 24 psi) exhibits a significant decrease in rolling resistance of 20% or more while meeting or exceeding other tire performance characteristics and standards including ride harshness and vibration.

What is claimed is:

1. A pneumatic tire for use on a wheel rim including, in combination, a pair of oppositely-opposed bead cores, a carcass structure each end of which is wrapped around a bead core, an apex disposed between the carcass structure and each of the ends thereof, a pair of oppositely-opposed sidewalls overlying said carcass structure, a chaffer strip positioned between said carcass structure and each of said sidewalls, a tread overlying said carcass structure and a belt reinforcing structure positioned therebetween; the improvement comprising: said carcass structure having a carcass aspect ratio of from about 50 to about 70, a pair of oppositely-opposed sidewall portions having a relatively thin radially outer portion and a relatively thick radially inner portion with the ratio of the minimum thinness of the radially outer portion to the maximum thickness of the radially inner portion being from about 1:3.5 to about 1:5, said sidewall portions each have an inner surface of an upper surface portion S and a lower surface portion O and an outer surface T, said upper surface portion S following the natural shape equation:

$$S = -\left[\frac{(\rho_m)^2}{(\rho_o)}\right][F(\theta, K)] - [\rho_o][E(\theta, K)] \quad \text{(I)}$$

wherein;

$$\theta = \arcsin \sqrt{\frac{\rho_o^2 - \rho^2}{2(\rho_o^2 - \rho_m^2)}} \; ;$$

$$K = \sqrt{\frac{2(\rho_o^2 - \rho_m^2)}{\rho_o}} \; ;$$

S is equal to the axial distance from the centerplane to the natural shape line of the carcass structure;

$\rho_o$ is equal to the radius from the axis of rotation at the centerline of the tire to the natural shape line of the carcass structure;

$\rho_m$ is equal to the radius from the axis of rotation to the maximum axial distance on the natural shape line of the carcass structure to the centerplane of the tire;

$F(\theta, K)$ and $E(\theta, K)$ are elliptical integrals of the first and second kind, respectively, said lower surface portion O following equation:

$$O = K_o + K_1 X + K_2 X^2 + K_3 X^3 + K_4 X^4 + K_5 X^5 \quad \text{(II)}$$

wherein,

O is the axial distance from the mid-circumferential plane of the tire;

X is the distance from the rotational axis of the tire;

| | |
|---|---|
| $K_o = 6.42$ | $K_3 = 1.69715$ |
| $K_1 = 23.81$ | $K_4 = .11605$ |
| $K_2 = 10.6733$ | $K_5 = .0029$ | and said outer surface T following equation:

$$Th = K_o' + K_1' X + K_3' X^3 + K_4' X^4 + K_5' X^5 \quad \text{(III)}$$

wherein,

Th is the gauge thickness from the contour of the inner surface measured parallel to the axis of rotation of the tire to the outer surface contour T;

X is the distance from the rotational axis of the tire; and

| | |
|---|---|
| $K_o' = -3.981$ | $K_3' = -2.73194$ |
| $K_1' = -44.639$ | $K_4' = 0.17864$ |
| $K_2' = 18.2917$ | $K_5' = -.004329$ |

2. A pneumatic tire according to claim 1 wherein said carcass aspect ratio is from 55 to 65, and said radially inner portion having a maximum thickness at a distance of approximately 20% of the maximum carcass section height.

3. A pneumatic tire according to claim 2 wherein said ratio is about 1:4.

4. A pneumatic tire according to claim 1 wherein said outer surface T follows the equation:

$$Th = K_o' + K_1' X + K_2' X^2 + K_3' X^3 + K_4' X^4 + K_5' X^5 \quad \text{(III)}$$

wherein;

Th is the gauge thickness from the contour of the inner surface measured parallel to the axis of rotation of the tire to the outer surface contour T;

X is the distance from the rotational axis of the tire; and

| | |
|---|---|
| $K_o' = -3.981$ | $K_3' = -2.73194$ |
| $K_1' = -44.639$ | $K_4' = 0.17864$ |
| $K_2' = 18.2917$ | $K_5' = -.004329$ | with a deviation of GT following equation:

$$GT = K_1'' X + K_o''$$

wherein;

GT is the deviation in thickness;

X is the distance from the rotational axis of the tire;

$K_1'' = -0.0526$ $K_o'' = 0.6208$

5. A tire according to claim 4 wherein said aspect ratio is about 60.

6. A pneumatic passenger tire and rim combination for use on a wheel mountable on a motor vehicle including, in combination, a pneumatic passenger tire according to claim 5 and a rim having a rim bead seat angle of from about 2° to about 10°, a rim flange angle of from about 25° to about 60° and a rim flange height of from about 7% of SH to about 11% of SH.

7. A pneumatic passenger tire according to claim 1 wherein said carcass aspect ratio is about 60.

8. A pneumatic passenger tire and rim combination for use on a wheel mountable on a motor vehicle including, in combination, a pneumatic passenger tire according to claim 7 and a rim having a rim bead seat angle of from about 2% to about 10°, a rim flange angle of from about 25° to about 60° and a rim flange height of from about 7% of SH to about 11% of SH.

9. A pneumatic passenger tire and rim combination according to claim 8 wherein said rim bead seat angle is about 5°, said rim flange angle is about 50°, and said rim flange height is about 9% of SH.

10. A pneumatic tire and rim combination for use on a wheel mountable on a motor vehicle including, in combination, a pneumatic tire according to claim 1 and a rim having a rim bead seat angle of from about 2° to about 10°, a rim flange angle of from about 25° to about 60° and a rim flange height of from about 7% of SH to about 11% of SH.

11. A pneumatic tire and rim combination according to claim 10 wherein said rim bead seat angle is about 5°, said rim flange angle is about 50°, and said rim flange height is about 9% of SH.

12. A pneumatic tire and rim combination according to claim 11 wherein said carcass aspect ratio is about 61.5.

13. A pneumatic tire and rim combination according to claim 1 wherein said carcass aspect ratio is about 61.5.

14. A pneumatic passenger tire and rim combination for use on a wheel mountable on a motor vehicle including in combination, a pneumatic passenger tire according to claim 1, said carcass structure having a plurality of parallel rubber coated fabric cords disposed at an angle from about 75° to 90° with respect to the mid-circumferential plane of said tire, a chaffer strip positioned between said carcass structure and each of said sidewalls.

* * * * *